Oct. 27, 1964 T. J. LYNCH 3,154,698

SHIFT-REGISTER STAGE EMPLOYING PAIR OF CASCADE-CONNECTED TRANSISTORS TO DISCHARGE STORAGE CAPACITOR TO THEREBY SET FLIP-FLOP

Filed April 16, 1963

INVENTOR
THOMAS J. LYNCH

BY Paris, Haskell & Levine

ATTORNEY

United States Patent Office 3,154,698

Patented Oct. 27, 1964

3,154,698

SHIFT-REGISTER STAGE EMPLOYING PAIR OF CASCADE-CONNECTED TRANSISTORS TO DISCHARGE STORAGE CAPACITOR TO THEREBY SET FLIP-FLOP

Thomas J. Lynch, Philadelphia, Pa., assignor, by mesne assignments, to United Aircraft Corporation, a corporation of Delaware Filed Apr. 16, 1963, Ser. No. 273,498
5 Claims. (Cl. 307—88.5)

Figures 1, 1A, 2:
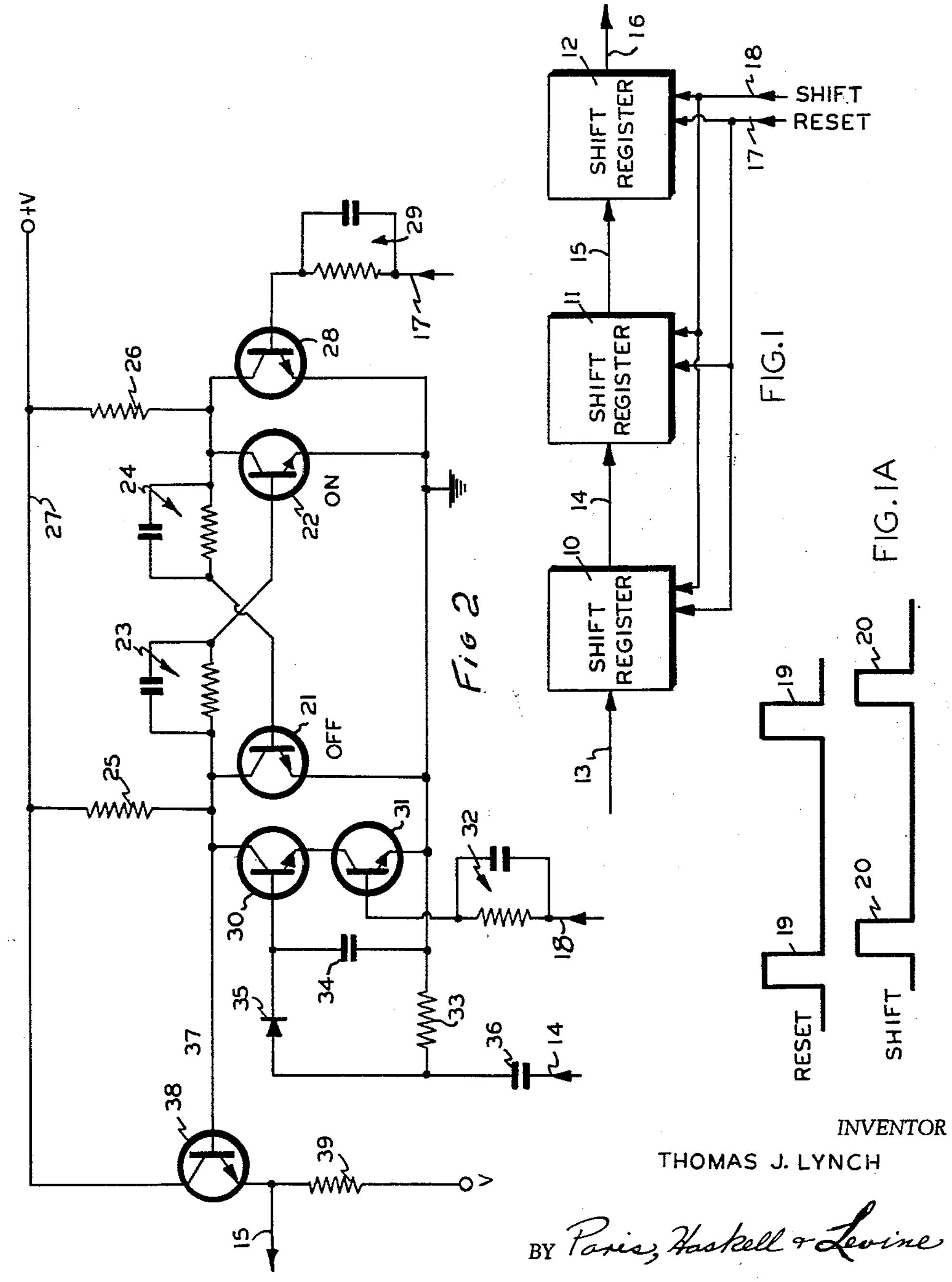

This invention generally relates to improvements in electronic shift registers, and more particularly to improved shift registers which may be individually packaged as modules in microminiature sizes, and employing a minimum number of transistor dice and resistor and capacitor components.

It is accordingly a principal object of this invention to provide improved shift register circuits capable of being packaged in microminiature sizes.

Another object is to provide such circuits that completely eliminate the need for inductances, and that may be constructed of microminiature printed circuits, deposited resistors, microminiature capacitors, and unhoused transistor dice.

A still further object is to provide such circuits having improved gating means for storing, transferring, and shifting impulses.

Still another object is to provide such circuits that may be packaged within micro-sized modular housings for detachable plug-in assembly, to enable synthesizing of multistage shift register circuits having different numbers of stages.

Other objects and many additional advantages will be more readily understood by those skilled in the art after a detailed consideration of the following specification taken with the acompanying drawings wherein:

FIG. 1 is a block diagram illustrating a plurality of cascaded shift register circuits according to the present invention, and FIG. 1A is a waveform timing diagram for illustrating the time relationship between the reset and shift pulses being employed in operating the circuitry, and FIG. 2 is an electrical schematic diagram illustrating circuit details of one preferred shift register stage according to the invention.

Referring to the drawings and initially to FIG. 1, illustrating the cascading of a plurality of shift register stages, it is noted that each of these stages, such as the second stage 11, is provided with an input line 14, an output line 15, a shift pulse receiving line 18, and a reset pulse receiving line 17. For interconnecting these stages in cascade, the output line from each stage is connected to the input line of the next, all of the reset lines 17 are connected in common to receive reset pulses 19, and all of the shift line 18 are connected in common to receive shift pulses 20.

In operation, a pulse to be successively shifted from stage to stage in the register is initially entered into the input line 13 of the first stage 10 and is there stored but does not otherwise change the condition of the stage 10. Thereafter, all stages are energized by the reset and shift pulses 19, and 20, respectively, in the time delayed relationship as illustrated in FIG. 2, whereby the reset pulse is first applied to all of the stages and then the shift pulse 20 is applied. The reset pulse 19 operates to reset any one of the stages in which a pulse has been previously entered, and in doing so, to transfer a pulse over the output line of that stage to the next stage where it is stored but not entered. Thereafter, the shift pulse 20 is received, and this operates upon all stages to enter into each stage any pulse that has previously been stored. Thus, presupposing that all of the stages are initially cleared when the first pulse is entered over input line 13 to the first stage 10, the first reset pulse 19 being applied over line 17 to the stages has no effect upon any of the stages, and the first shift pulse 20 operates only upon the first stage 10 to enter the stored pulse into the first stage 10. Thereafter, the next succeeding reset pulse being received over line 17 resets stage 10 to its original condition, and in doing so, conditions stage 10 to produce an output pulse over line 14 to be stored in the input of the second stage 11. Upon the next accompanying shift pulse 20, the stored pulse is entered into the second stage to complete the shift or transfer of a pulse from the first stage 10 of the register to the second stage 11. Thus, in response to each pair of shift and reset pulses, a pulse is successively transferred from stage-to-stage down the cascaded chain, until eventually emerging from the output 16 of the final stage 12.

FIG. 2 illustrates a preferred circuit for a single stage of the register and numbered corresponding to the second stage 11. As shown, there is provided a pair of transistors 21 and 22 being interconnected in mutual feedback relationship to provide a flip-flop circuit, a transistor 28 connected in parallel with transistor 22 of the flip-flop for resetting the flip-flop circuit, an output transistor 38 being energized responsively to the second flip-flop transistor 21, and a pair of series connected gating transistors 30 and 31 together with a storage capacitor 34 for storing pulses in the stage.

Transistors 21 and 22 are interconnected in mutual feedback relationship by means of a resistor-capacitor network 23 interconnecting the collector electrode of transistor 21 to the base electrode of transistor 22, and a second resistor-capacitor network 24 interconnecting the collector electrode of transistor 22 to the base electrode of transistor 21. The collector electrode of transistor 21 receives positive energization from the potential on line 27 and through a resistor 25, and the collector electrode of transistor 22 similarly receives a positive energization through resistor 26. The emitter electrodes of both transistors are commonly connected to the return for the potential source.

With this manner of interconnection, only one of these transistors may be conducting and the other may be nonconducting, since the conduction of either transistor reversely biases the opposite transistor into nonconducting condition.

Reset transistor 28 is connected with its collector-emitter electrodes in parallel with those of transistor 22, and with its base electrode adapted to be energized by positive going reset pulses 19, being received over line 17 and through a resistor-capacitor network 29. When a positive going impulse is received at the base of transistor 28, it is triggered into conducting condition and the potential at the collector electrode thereof drops to ground potential, thereby applying a negative pulse to the base of transistor 21 to reset the flip-flop circuit with transistor 22 being rendered conducting or in an "on" condition, as shown and with transistor 21 being rendered nonconducting or in an "off" condition as indicated.

The output transistor 38 receives energization at its base electrode from the collector electrode of transistor 21 of the flip-flop circuit, and is normally biased for a minimum conducting condition when the transistor 21 is conducting. However, whenever flip-flop transistor 21 is rendered nonconducting, the potential level at the collector electrode rises to that of the power source, thereby triggering the output transistor 38 into a maximum conducting condition and producing a positive pulse on output line 15.

The gating transistors 30 and 31 are interconnected in series circuit relationship, with the emitter electrode of transistor 30 being directly connected to the collector electrode of transistor 31, and with the two series connected transistors being connected in parallel with the collector-emitter electrodes of flip-flop transistor 21. For triggering the lower gating transistor 31 into operation, positive going shift pulses 20 are applied over line 18 and through a resistor-capacitor network 32 to its base electrode. The input storage capacitor 34 is interconnected between the base of the upper gating transistor 30 and ground, and is adapted to receive and store a charge in response to positive impulses being received over line 14 and being differentiated by a nutwork comprised of capacitor 36 and resistor 33. The positive going differentiated pulse is directed through a forwardly poled diode 35 to be stored on capacitor 34.

In operation, and presupposing that the stage does not initially contain an entered pulse, the flip-flop transistor 22 is normally conducting or in an "on" condition and the transistor 21 is nonconducting or "off."

Thereafter, in response to a positive input pulse over line 14, this pulse is differentiated and the positive portion is passed through the diode 35 and stored on the capacitor 34. Since the lower gate transistor 31 is normally nonconducting, the impedance presented to the storage capacitor 34 at the base of transistor 30 is very high, and the entered pulse is therefore stored and maintained on capacitor 34.

A rest pulse 19, thereafter being applied over line 17, has no effect when the stage is in this condition, since the negative pulse being applied to the flip-flop transistor 21 merely maintains the transistor 21 nonconducting and does not change the condition of the flip-flop circuit. Upon the next succeeding shift pulse 20 being entered over line 18, the lower gate transistor 31 is rendered conductive and permits the stored pulse on capacitor 34 to be discharged through the base-to-emitter electrodes of the transistor 30 and then through the collector-emitter electrodes of transistor 31, which, as will be recalled, is rendered conducting by the shift pulse 20 over line 18. Since transistors 30 and 31 are now both conducting, the potential level at the collector electrode of transistor 30 is dropped to substantially ground level, and this drop in potential is applied to the base electrode of flip-flop transistor 22, thereby functioning to render transistor 22 nonconducting and transistor 21 conducting. Thus, in response to the first shift pulse 20 over line 18, the stored input pulse on capacitor 34 is discharged and applied to reverse the condition of the flip-flop circuit, thereby entering the input pulse into this stage.

The reversal of the flip-flop circuit does not result in a positive output pulse being produced over line 15 to the next stage due to the fact that the output transistor 38 receives a negative pulse over line 37 and accordingly produces only a negative going impulse over line 15.

In response to the next succeeding reset pulse over line 17, the flip-flop circuit is then reset to its initial condition with transistor 22 being rendered conducting and transistor 21 being again rendered nonconducting. When transistor 21 is rendered nonconducting, the potential at its collector electrode rises and transistor 38 produces a positive going potential at output line 15 leading to the next stage. Thus, after a pulse has been entered into this stage, the next succeeding reset pulse 19 being received functions to reset the stage and to transfer an output pulse to the next succeeding stage where it is stored on a storage capacitor, identical to capacitor 34 of the described stage.

Thus in response to each pair of reset and shift pulses, each shift register stage is operated in succession to enter a pulse from a preceding stage and then to be reset and to transfer the pulse to the next succeeding stage.

It will be noted that the preferred circuit possesses a minimum number of components, comprising a total of only six transistors, eight resistors, and six capacitors. The resistors are all preferably microprinted circuit resistors that may be deposited directly on a microsized substrate, and the capacitors, with the exception of storage capacitors 34, may likewise be provided in printed form, with capacitor 34 being constructed in microsize. The very low current switching transistors being required by the circuit are preferably provided in the form of unhoused transistor dice that are fastened and connected on the miniature substrate and interconnected with the other components and the connectors by means of thermal compression bonding as is well known to those skilled in the art. As a result, the complete circuit may be packaged within a microminiature modular housing having dimensions less than one inch square and about one-eighth inches thickness, and having a series of miniature projecting pin terminals for providing connections to the input, output, shift, reset, and battery potential lines (not shown).

Although but one preferred embodiment of the invention has been illustrated and described, it is believed evident that many changes may be made by those skilled in the art without departing from the spirit and scope of this invention. Accordingly, this invention is to be considered as being limited only by the following claims appended hereto.

What is claimed is:

1. A shift register comprising a pair of transistors interconnected in a flip-flop circuit configuration, a first and second gate transistor being interconnected in series for short circuiting one of said pair of transistors whenever both gate transistors are rendered conducting, each of said gate transistors having a control electrode, means for applying a triggering impulse to the control electrode of the first gate transistor to render it conducting, and a storage capacitor in circuit with said gate transistors to discharge through the control electrode of the second gate transistor and through the first gate transistor when the first gate transistor is rendered conducting, thereby to reverse the condition of the flip-flop circuit.

2. A microminature shift register stage comprising: a pair of transistors interconnected in a flip-flop configuration, a reset transistor directly shunting one of said pair of transistors, an output transistor coupled to the other of said pair of transistors, a pair of gating transistors connected in cascade across the other of said pair of transistors, a storage capacitor coupled to said cascaded gating transistors for discharge therethrough whenever a given one of said gating transistors is independently rendered conducting, means for applying an input pulse to be stored on said storage capacitor, means for applying a shift pulse to independently render said given one of the gating transistors conducting, thereby to permit a discharge of said capacitor and the reversal of said flip-flop circuit, and means for subsequently applying a reset pulse to said reset transistor thereby to reset said flip-flop circuit.

3. A shift register comprising: a pair of transistors interconnected for flip-flop operation, a pair of cascaded switching transistors connected to said pair of transistors and being energizable to reverse the condition of the flip-flop circuit, a storage capacitor for receiving a charge and coupled to one of the said cascaded transistors, means for coupling a shift impulse to the other of said cascaded transistors to condition it for conduction, whereby when both transistors are energized for conduction a charge on said capacitor is permitted to discharge through both transistors, a reset transistor in circuit with the flip-flop and responsive to a reset pulse for resetting the flip-flop to its original condition, and an output transistor coupled to and responsive to the flip-flop circuit being reset to its original condition to provide an output impulse.

4. A storage register stage comprising: a pair of transistors interconnected for flip-flop operation, a pair of cascaded gating transistors in series and interconnected with one of said flip-flop transistors to trigger that transistor into conduction when both cascaded transistors are jointly energized, a reset transistor coupled to the other flip-flop transistor and responsive to energization for resetting the flip-flop, means for applying energization to one of said cascaded gating transistors to render it conductive, and a storage capacitor in circuit with said gating transistors and connected to energize the second of the cascaded transistors into conducting condition when a charge is stored thereon.

5. A microsized shift register stage comprising: a flip-flop circuit, means responsive to reset impulses for resetting said flip-flop to a given state, a storage capacitor, and a pair of series connected transistors interconnected to the flip-flop circuit to reverse the flip-flop to a condition other than said given state, said capacitor connected to energize one of said series connected transistors for conduction and to discharge through both of said series connected transistors, and means responsive to shift pulses for rendering the other of said transistors conducting.

References Cited by the Examiner

UNITED STATES PATENTS 3,088,041 4/63 Hinkein et al. -------- 307—88.5

ARTHUR GAUSS, *Primary Examiner.*